Dec. 2, 1947.     H. H. SWOGER     2,431,843
INJECTION PRESS
Filed Feb. 18, 1944     3 Sheets-Sheet 1
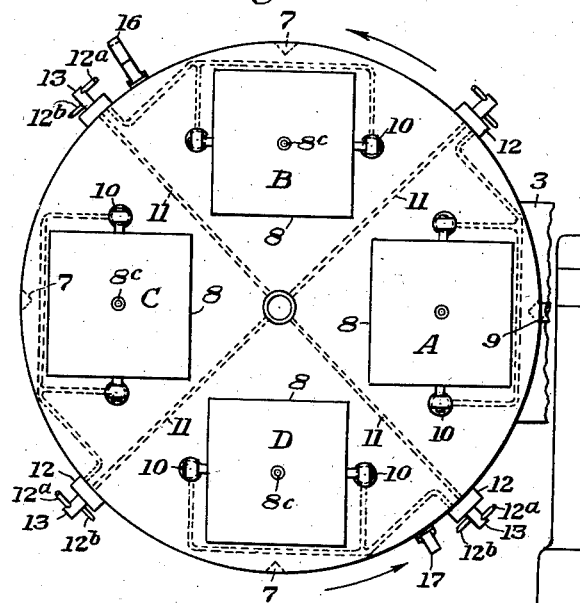
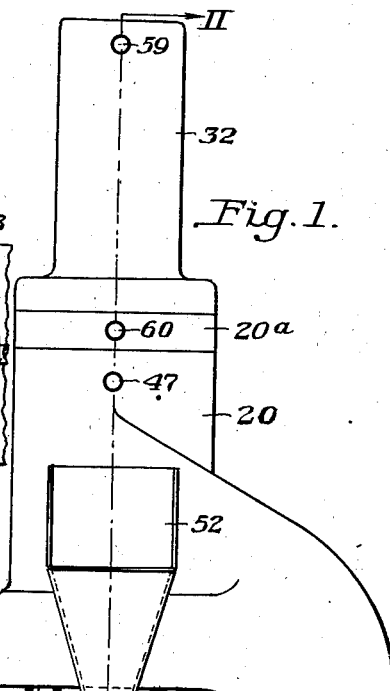
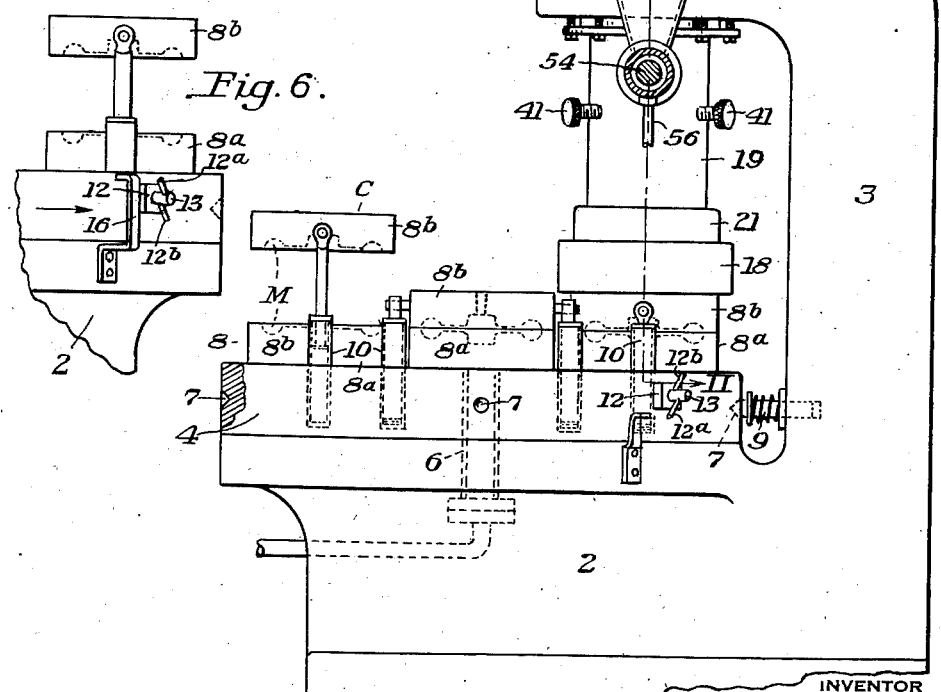
INVENTOR
Harold H. Swoger
by Christy, Parmelee and Strickland
his attorneys

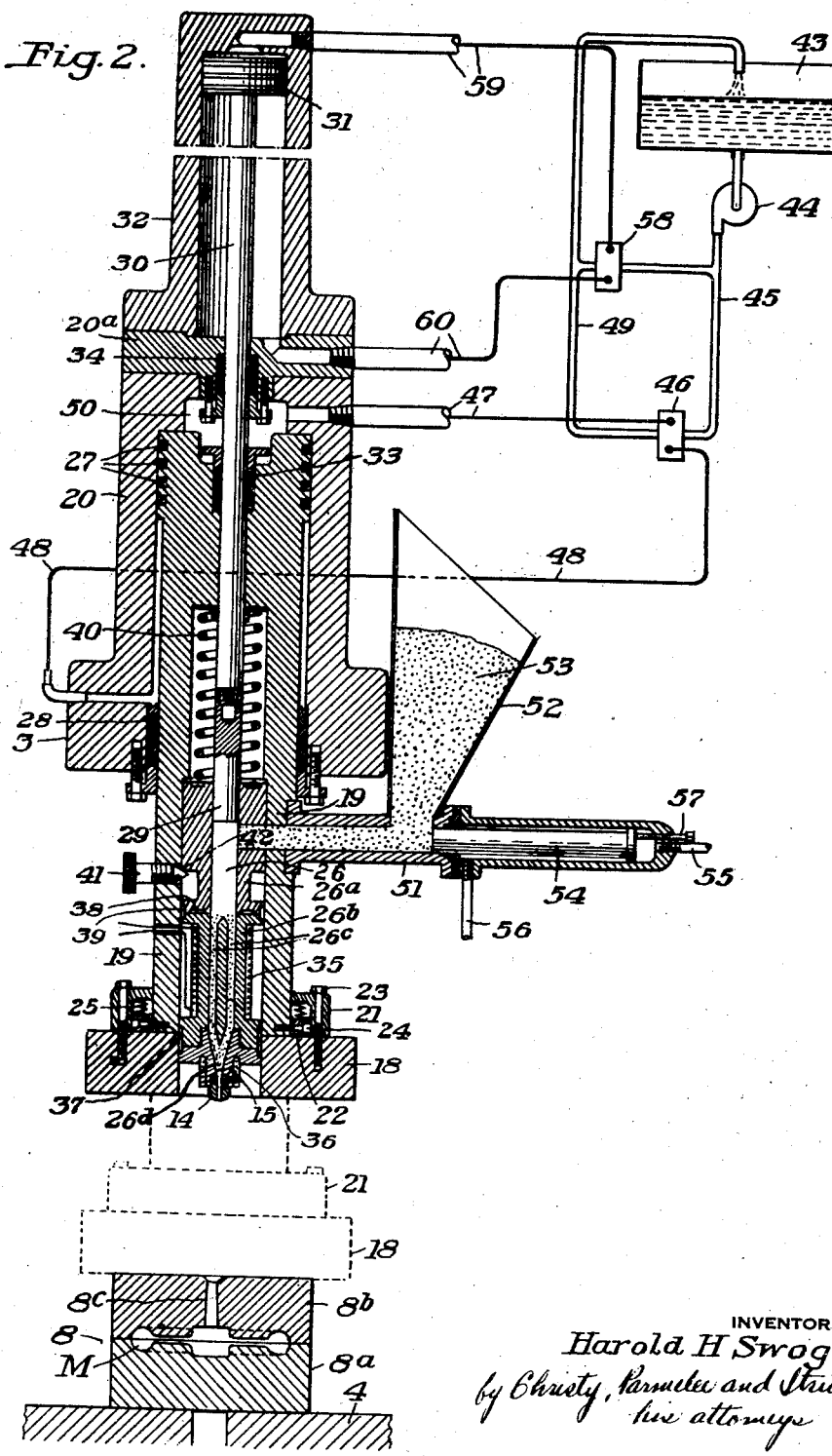

Patented Dec. 2, 1947

2,431,843

UNITED STATES PATENT OFFICE 2,431,843

INJECTION PRESS

Harold H. Swoger, Pittsburgh, Pa.

Application February 18, 1944, Serial No. 522,856

11 Claims. (Cl. 18—30)

My invention relates to the molding of plastic material, and consists in certain new and useful improvements in an injection molding press.

The structure in which the invention is centered comprises a particularly effective arrangement of a fluid operated plunger for clamping the molds of a press in tightly closed position and securing the injection nozzle of the press in proper assembly with the inlet of the mold, to permit a charge of fluid plastic material to be injected into the mold matrix under the thrust of an injection plunger. The organization of the two plungers is such that all thrust thereof is exerted coaxially and in the same direction, the thrust of the injection plunger serving not merely to force the plastic material into the mold, but to assist the mold-clamping plunger in holding the injection nozzle in fluid-tight assembly with the mold. This structural organization, as well as the other improvements of the invention, will be understood upon reference to the accompanying drawings, in which:

Figure 1 is a view, mainly in side elevation but partly in vertical section, of an injection press which in exemplary way embodies the invention;

Figure 2 is fragmentary view of the press to larger scale and in vertical section on the plane II—II of Figure 1. In this view the press-operating hydraulic equipment is illustrated diagrammatically;

Figure 3:
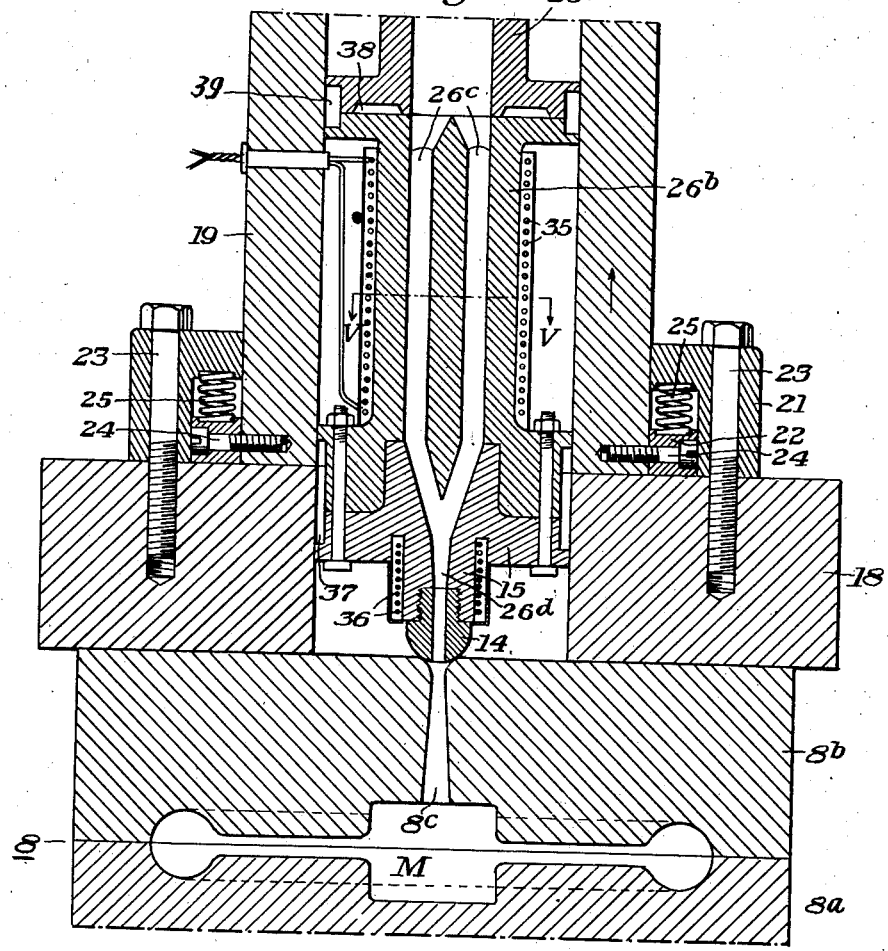
Figure 5:
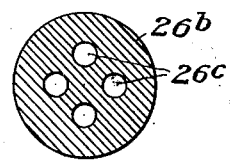

Figure 3 is a fragmentary sectional view of certain portions of the press on the same plane as Figure 2, but to still larger scale. Whereas, in Figure 2 the press is shown in open position, whereby the mold-carrying turret or turn-table may be rotated to move a mold into position beneath the injection nozzle of the press, in Figure 3 the press is shown in closed position, with the injection nozzle secured in assembly with a mold;

Figure 4 is a view in plan of the mold-carrying turn-table;

Figure 5 is a cross sectional view of the injection nozzle, as seen on the plane V—V of Figure 3; and Figure 6 is a fragmentary view in side elevation of the turn-table, showing a certain valve-operating mechanism of the press structure.

Referring to the drawings, the reference numeral 2 is applied to the base of the press, and rising rigidly from such base is a standard 3 that carries the injecting instrumentalities. Upon the base 2, a turn-table 4 is mounted to rotate on a hollow spindle 6, and upon such turn-table a plurality of molds 8 is borne, there being four molds in this case, spaced ninety degrees apart. Mechanism is provided within the base for intermittently turning the table on its spindle through ninety degrees, to bring the molds successively into position in the molding station; that is, into position of registry with the injecting instrumentalities carried by the standard 3. The mechanism for so rotating the table is well known in the art, and for this reason I shall involve neither the drawings nor the specification with a consideration of it. Suffice it to note that the turn-table is provided on its circumferential edge with sockets 7 that are radially aligned severally with the centers of the molds, and on the standard 3 a spring-backed detent 9 is arranged to latch in the socket associated with each particular mold advanced into the molding station, whereby the inlet of the particular mold is vertically aligned with the outlet of the injection nozzle, as will presently appear.

Before turning to a consideration of the instrumentalities in which the invention is particularly centered, the organization of the molds per se will be described. Each mold comprises a basal portion 8a secured rigidly to the face of the turn-table, and a top portion 8b carried by the plungers of a pair of pneumatic cylinders 10. The cylinders 10 are rigidly mounted in vertical position in the turn-table structure, and are connected by pipes 11 to the passage within the hollow spindle on which the table turns. The passage within the spindle is connected in conventional way to means for supplying air under pressure, and in the line of communication between such means (not shown) and the two cylinders 10 of each mold is a valve 12. The valves 12 are two-way valves, each having two stems, 12a and 12b, extending in opposite radial directions from the rotor shaft 13 of the valve. When the valve rotor is in one of its alternate positions, compressed air is delivered under pressure from said means to the bottoms of the cylinders, with the effect that the plungers in said cylinders are forced upward, lifting the top mold portion 8b into elevated position, as indicated at C in Figure 1. Alternatively, when the valve rotor is in its other position, the delivery of compressed air is blanked from the cylinders, and the cylinders are opened to the outer atmosphere, with the consequence that the weight of the mold part 8b forces the plungers downward, until such mold part comes to rest upon the associate basal mold part 8a. The two mold portions, when closed in face-to-face contact, form a matrix M in which the plastic material is shaped and cured in the form of the article to be produced. The upper mold portion includes an inlet passage 8c (Figures 2 and 3) through which the plastic material is injected into the matrix M, the outer end of the passage being flared to receive the tip 14 of an injection nozzle 15, as will appear in greater detail in the ensuing specification.

In Figure 4 the reference character A indicates the molding station, in which the matrix of the mold receives the injected charge of plastic material. As in the step-by-step rotation of the turn-table a mold comes to momentary rest in station A, the injecting instrumentalities supported by standard 3 descend into clamping engagement with the mold and perform the essential injecting operation. When the molding operation is completed, the said instrumentalities rise, freeing the engaged mold. Then, the table turns in counter-clockwise direction (Figure 4), carrying the charged mold into station B, and moving the succeeding mold into position A. As the charged mold on the turning table approaches the station B, the stem 12a on the valve 12 of the mold strikes a valve-throwing finger 16 secured to the stationary base of the press. The passing engagement of the stem 12a with the finger 16 turns the valve rotor 13, whereby compressed air is delivered through lines 11 into the bottoms of the cylinders 10 of the mold. Thus, as the charged mold enters station B, the plungers of the cylinders 10 are forced upward, raising the top portion 8b of the mold. The valve rotor remains in the so-adjusted position, and the top portion of the mold remains in elevated position, while the mold is advanced to and dwells in station C. During the time the top mold portion remains in elevated position, the attendant removes the molded article from the mold matrix, and removes any plastic material that may remain in the mold inlet passage 8c. When in the step-by-step turning of the table the emptied and cleansed mold approaches the station D, the stem 12b of its valve 12 engages a stationary finger 17 on the base of the press, and the valve rotor is returned to its initial position, in which the supply of compressed air is cut off from the cylinders 10, and communication is established between the bottoms of the cylinders and the atmosphere. The weight of the top portion of the mold then forces the plungers of the cylinders downward, displacing the air from the bottoms of the cylinders. The top portion 8b of the mold settles again into position of face-to-face contact upon the basal mold portion 8a, thereby closing the mold and putting it in readiness again to be advanced into the molding station A. In the next-ensuing movement of the table, the mold is brought to rest in said molding station, and the operations described are repeated. So it is with each of the four molds on the turn-table.

While I have described the mold-operating cylinders 10 to be pneumatically operated, it will be understood that their operation may be hydraulic, as is well within the knowledge of the engineer.

Turning now to the features in which the invention are particularly centered, it will be understood that, when the mold enters station A, a clamping head 18 engages it. The clamping head is carried by a hydraulically operated plunger 19 arranged for vertical reciprocation in a power cylinder 20 that is rigidly borne by the standard 3. The head of the plunger is equipped in usual way with piston rings 27, and at the lower end of the cylinder a packing gland assembly 28 is provided, to prevent leakage of liquid between the walls of the cylinder and plunger.

The clamping head 18 is secured to the plunger 19 by means of two rings 21 and 22. The ring 21 is of inverted L shape in cross section, and is attached to the clamping head by screws 23, while the ring 22 is secured to the lower end of the plunger by means of screws 24. As shown in the drawings, the ring 22 is confined between the body of the head 18 and the horizontal flange of the L-shaped ring 21, and between such flange and the ring 22 springs 25 are arranged. The springs are spaced apart circumferentially of the ring assembly, and afford a utility presently to be described.

Arranged within the plunger 19, and coaxial therewith, is an injection cylinder 26 formed of upper and lower parts 26a and 26b. The lower end of the part 26b is equipped with the injection nozzle 15, above mentioned. Within the upper part 26a an injection plunger 29 is reciprocable, the plunger 29 being carried on the lower end of a piston rod 30 that extends upward through the heads of both the plunger 19 and the cylinder 20, and is equipped with a piston 31 that is vertically reciprocable in a hydraulic cylinder 32. The cylinder 32 is rigidly assembled in axial alignment with the cylinder 20, a block 20a being arranged and secured between the cylinders, as shown. Packings 33 and 34 prevent leakage between the piston rod and the heads of cylinder 20 and plunger 19.

The lower part 26b of the injection cylinder is of conventional construction, including a plurality of passageways 26c leading from the bore of the upper cylinder part 26a and merging in a single passage 26d that opens into the outlet of the injection nozzle 15. The said lower part of the injection cylinder is heated by means of an electrical heating coil 35, and the injection nozzle may, if desired, also be heated by an electrical coil, as shown at 36. The heating of the body of the injection cylinder part 26b, plus the particular arrangement of the passageways formed therein, insure that the plastic material injected into the molds shall be of proper uniform plasticity. Air spaces 37, 38 and 39 are provided, in the injection cylinder body as shown, to inhibit excessive transfer of heat from the heated portions of the cylinder to the adjacent parts of the apparatus.

The injection cylinder is backed within the plunger 19 by a powerful compressed spring 40 that tends to force the cylinder downward within the plunger. But this movement of the injection cylinder is prevented by means of one or more stop-screws 41, against whose conical points the body of the cylinder abuts, as shown at 42. The stop-screws are adjusted in such position that the nozzle 15 of the injection cylinder will project below the clamping head such an interval that, when the plunger is moved downward into the molding position and the injection nozzle 15 is pressed into contact with the flared mouth of the inlet 8c of the mold, the body of the injection cylinder will be displaced from contact with the stop-screws, leaving the nozzle seated upon said mold inlet under the stress of the spring 40.

The plunger 19 is operated by means of fluid, preferably oil, that is drawn from a storage tank 43 and supplied under pressure by a pump 44. Pipe 45 delivers oil under pressure from the pump to a control valve 46, from which extend three lines 47, 48, and 49, the lines 47 and 48 leading respectively to the upper and lower ends of the cylinder 20, and the line 49 leading to the storage tank. As the turn-table brings a mold into position of rest in the molding station, the valve 46 is actuated; oil under pressure is delivered into a chest 50 in the upper end of the cylinder 20, and communication is established between the pipe 48 and the return line 49. Under the pressure of the oil delivered into the chest 50, the plunger 19 is driven downward, seating the nozzle 15 under the pressure of the spring 40 upon the mold inlet and bringing the head 18 to bear upon the mold, clamping the mold portions in absolutely tight contact. When the press parts have been brought into such positions, a charge of plastic material is introduced to the upper section 26a of the injection cylinder, whereupon the plunger 29 is actuated to inject the charge into the matrix M of the mold.

The means for supplying the charge of plastic material to the injection cylinder comprise a cylinder 51, secured to the wall of the plunger 19 and movable in unison therewith. Carried by the feeding cylinder 51 is a hopper 52 that contains a supply 53 of the plastic material (in powdered form) which is to be molded. Organized with the feeding cylinder, and the outlet of the hopper that opens thereinto, is a feeding plunger 54 having leads 55 and 56 which extend to suitable means (not shown) for supplying air or liquid under pressure, as needed to effect the desired reciprocation of the feeding plunger. The bore of the feeding cylinder 51 is continued through the walls of both the plunger 19 and the injection cylinder 26. The plunger 54 serves not merely to feed the powdered plastic material 53 into the injection cylinder, but serves additionally, in cooperation with the outlet of the hopper 52, as a charge-measuring device. That is to say, the plunger operates as a valve in the outlet of the hopper. In the fully retracted position of the plunger 52, in which position it is shown in Figure 2, the outlet of the hopper is fully opened, so that the advance of the feeding plunger through its stroke will deliver a maximum charge into the injection cylinder, the maximum charge of material being required in the case of the articles produced in the matrices M of the molds 8. When, however, smaller articles are to be formed, and appropriate molds are provided on the turn-table, the feeding plunger 54 will not be retracted all the way across the outlet of the hopper, but will be retracted only so far as will permit the desired amount of material to descend into the said cylinder 51, to form a charge of the desired amount. In order to insure that the plunger 54 will always come to rest in proper charge-gaging position, an adjustable screw 57 is provided at the end of the cylinder in which the plunger 54 is operable. Manifestly, the adjustment of this screw may be made, whereby the plunger will always come to rest in position that will provide the desired gaging of the charge of material entering the feeding cylinder from the hopper 52.

When the mold-clamping head 18 and the injection nozzle 15 have been lowered into molding position, and a charge of plastic material has been introduced to the injection cylinder, the injection plunger 29 is forced downward, effecting the injection of plastic material through the nozzle 15 and inlet 8c into the matrix M of the mold. The downward movement of the injection plunger is effected by means of liquid delivered by the pressure pump 44 through valve 58 and line 59 to the upper end of the cylinder 32, the lower end of the cylinder 32 communicating by way of line 60 and valve 58 to the return line 49 leading to the storage tank 43.

It will be understood that when the press is in normal operation, the passages 26c within the heated portion of the injection cylinder will always be filled with plastic material, and that the charge of plastic material introduced into the upper portion of the injection cylinder will, as the plunger 29 descends, force from the passages 26c a quantity of material equal to the volume of the charge. In this way, the material is permitted to remain in the heated portion of the injection cylinder long enough for the heat to convert the powdered plastic material into a condition of uniform plasticity, whereby under the pressure of the plunger the material injected into the mold completely fills the matrix, wherein it solidifies and cures in the form of the article being produced.

After the injection operation, the valves 58 and 46 are manipulated, with the consequence that the pump 44 delivers fluid into the bottom of the cylinders 32 and 20, and the upper ends of said cylinders are connected to the discharge or return line 49. The rise of the plungers 29 and 19 is effected.

It will be understood that when the head 18 is moved downward into pressure engagement with a mold, the downward thrust of the plunger 19 is positively applied immediately upon the head 18, and is transmitted through the head to the top of the assembled mold. On the other hand, when the plunger 19 is raised to lift the head 18 from mold-clamping position, the lifting stress required to overcome the weight of the head is yieldingly transmitted through the springs 25. While the springs 25 are of value in the turret type press herein illustrated, they are of particular utility in a column press; that is, a press having a single mold supported below or in line with the injection instrumentalities. In such an organization the mold part 8b may be rigidly secured to the clamping head 18, so that the reciprocation of the plunger 19 will open and close the mold, as well as perform the other function described. It will be readily understood that when the plunger 19 starts its upward stroke after a molding operation, the lifting force of the plunger is transmitted through the springs 25, and that there is a slight upward movement of the plunger and the injection cylinder assembly before the springs are compressed to the point where the head 18 and mold part 8b carried thereby begin to rise. This slight relative movement of the parts is adequate to lift the injection nozzle 15 from the mouth of the inlet passage 8c of the mold a sufficient distance to break the sprue; that is, the column of plastic material that extends in continuity out through the injection nozzle and into the mold inlet passage 8c, before the mold opens. The breaking of the sprue at a point within the inlet passage 8c permits the molded article to be removed from the mold matrix, since the portion of the sprue remaining in passage 8c may be readily withdrawn with the molded article with which it is integral.

In the organization described, it will be seen that the mold-clamping plunger 19, the injection cylinder 26, and the injection plunger 29 are all arranged coaxially. The injection cylinder is organized in the mold-clamping plunger which is movable within the variable limits permitted by the stop-screws 41 and the spring 40. The spring 40 provides means for forcefully seating the injection nozzle 15 upon the inlet of the mold, the nozzle-seating force being yielding force of relative great magnitude, yet of less magnitude than the thrust of the plunger 19. It is important to note that the plunger 29 in its injection stroke directs its thrust in the same direction as the spring 40, whereby optimum conditions preventative of leakage of the injected plastic material are obtained. The thrust of the mold-clamping plunger 19 is also directed in the same direction as the thrusts of the spring 40 and the injection plunger 29, and this, too, assists in providing perfect conditions for the injection molding operation.

It will be noted that the injection plunger 29 is formed separately from the piston rod 30, this being desirable since it permits the plunger to be made of a special hardened steel that may be removed and replaced as may be required in service. But in some cases the piston rod and plunger may be formed integrally of one and the same material.

A feature of the two-part injection cylinder is that the lower part 26b, with its injection nozzle and heating coils, may be readily removed as a unit from the assembly. This is particularly valuable in presses which in service are used to mold a variety of different articles of different plastic materials. In such presses, a plurality of injection cylinder parts 26b will be kept on hand, so that it will not be necessary to clean the plastic material from the small passages of the nozzle 15 and cylinder part 26b when it is desired to mold a plastic material of different color or composition than that last used. It is merely necessary to remove the lower part of the injection cylinder as a unit, and substitute another for it, it being understood that little or no difficulty is experienced in cleaning the bore of the upper part 26a of the injection cylinder, nor in removing the residual material from the feeding cylinder 51 and hopper 52.

The press of this invention is adapted to the injection molding of either thermo-plastic or thermo-setting materials, the adaptability of the press to the injection molding of the latter type of plastic materials being of great practical value. The rapidity with which the turn-table may be operated to position the molds in sequence under the injection instrumentalities, and the speed with which such instrumentalities may be operated to fill the molds prevents the chemical action that occurs as thermo-setting material is heated from progressing to the point where molding of the material becomes impractical, if not impossible.

The mold-clamping and injection instrumentalities described are particularly designed for use in turret or turn-table presses of the sort herein described, but it will be understood that they may be used in shuttle type presses, or multiple-jet presses, or single mold presses known to the art, and they may be employed in presses in which the injection nozzle and plunger are arranged horizontally rather than vertically as herein illustrated. And it will further be understood that within the terms of the appended claims various modifications and variations are permissible.

I claim as my invention:

1. An injection molding press comprising a mold having an inlet leading to the mold matrix, means for supporting the mold, two power cylinders supported in axially aligned position, a mold-clamping plunger in the first of said power cylinders, an injection cylinder yieldingly mounted within and on the axis of said plunger, an injection nozzle carried by said cylinder at the mold-engaging end of said plunger, means for supplying fluid to said first power cylinder for shifting said plunger between a position removed from said mold and a position in which said mold is forcefully clamped, with the injection nozzle seated upon the mold inlet, a plunger in said injection cylinder, a piston in the second of said power cylinders, a piston rod extending from the piston in said second power cylinder into the first power cylinder and to the plunger in said injection cylinder, and means for supplying fluid to reciprocate said piston and move said injection plunger through an injection stroke.

2. An injection molding press comprising a mold having an inlet leading to the mold matrix, means for supporting the mold, two power cylinders supported in axially aligned position, a mold-clamping plunger in the first of said power cylinders having a mold-clamping head yieldingly secured thereto, an injection cylinder yieldingly mounted within and on the axis of said plunger, an injection nozzle carried by said cylinder at the mold-engaging end of said plunger, means for supplying fluid to said first power cylinder for shifting said plunger between a position removed from said mold and a position in which said mold is forcefully clamped, with the injection nozzle seated upon the mold inlet, a plunger in said injection cylinder, a piston in the second of said power cylinders, a piston rod extending from the piston in said second power cylinder into the first power cylinder and to the plunger in said injection cylinder, and means for supplying fluid to reciprocate said piston and move said injection plunger through an injection stroke.

3. An injection molding press comprising a mold having an inlet leading to the mold matrix, means for supporting the mold, two power cylinders supported in axially aligned position, a mold-clamping plunger in the first of said power cylinders, an injection cylinder yieldingly mounted within and on the axis of said plunger, an injection nozzle carried by said cylinder at the mold-engaging end of said plunger, means for supplying fluid to said first power cylinder for shifting said plunger between a position removed from said mold and a position in which said mold is forcefully clamped, with the injection nozzle seated upon the mold inlet, a plunger in said injection cylinder, a piston in the second of said power cylinders, a piston rod extending from the piston in said second power cylinder into the first power cylinder and to the plunger in said injection cylinder, a packing between the first and second power cylinders for said piston rod, and means for supplying fluid to reciprocate said piston and move said injection plunger through an injection stroke.

4. An injection molding press comprising a mold having an inlet leading to the mold matrix, means for supporting the mold, two power cylinders supported in axially aligned position, a mold-clamping plunger in the first of said power cylinders, an injection cylinder yieldingly mounted within and on the axis of said plunger, an injection nozzle carried by said cylinder at the mold-engaging end of said plunger, means for supplying fluid to said first power cylinder for shifting said plunger between a position removed from said mold and a position in which said mold is forcefully clamped, with the injection nozzle seated upon the mold inlet, a plunger in said injection cylinder, a piston in the second of said power cylinders, a piston rod extending from the piston in said second power cylinder into the first power cylinder and to the plunger in said injection cylinder, a packing between the first and second power cylinders and a packing in said injection cylinder for said piston rod, and means for supplying fluid to reciprocate said piston and move said injection plunger through an injection stroke.

5. An injection molding press comprising a mold having an inlet leading to the mold matrix, means for supporting the mold, two power cylinders supported in axially aligned position, a mold-clamping plunger in the first of said power cylinders having a mold-clamping head yieldingly secured thereto, an injection cylinder yieldingly mounted within and on the axis of said plunger, an injection nozzle carried by said cylinder at the mold-engaging end of said plunger, means for supplying fluid to said first power cylinder for shifting said plunger between a position removed from said mold and a position in which said mold is forcefully clamped, with the injection nozzle seated upon the mold inlet, a plunger in said injection cylinder, a piston in the second of said power cylinders, a piston rod extending from the piston in said second power cylinder into the first power cylinder and to the plunger in said injection cylinder, a packing between the first and second power cylinders and a packing in said injection cylinder for said piston rod, and means for supplying fluid to reciprocate said piston and move said injection plunger through an injection stroke.

6. An injection molding press comprising a multiple-part mold having an inlet leading to the mold matrix, means for supporting the mold, means for clamping the mold parts tightly together comprising a power cylinder and a hollow plunger extending therefrom and being reciprocable thereby, an injection cylinder arranged within said hollow plunger and being coaxial therewith, said injection cylinder carrying an injection nozzle, means carried by said hollow plunger for forcefully seating said nozzle upon the inlet of said mold when the hollow plunger is in mold-clamping position, means for introducing a charge of molding material into said injection cylinder, an injection plunger in said injection cylinder arranged coaxially with said power cylinder and its hollow plunger, and means arranged coaxially with and being effective in the same direction as said hollow mold-clamping plunger and said nozzle-seating means for powerfully moving said injection plunger through an injection stroke.

7. An injection molding press comprising a multiple-part mold having an inlet leading to the mold matrix, means for supporting the mold, means for clamping the mold parts tightly together comprising a power cylinder and a hollow plunger extending therefrom and being reciprocable thereby, an injection cylinder arranged within said hollow plunger and being coaxial therewith, said injection cylinder carrying an injection nozzle, spring means arranged within said hollow plunger for forcefully seating said nozzle upon the inlet of said mold when the hollow plunger is in mold-clamping position, means for introducing a charge of molding material into said injection cylinder, an injection plunger in said injection cylinder arranged coaxially with said power cylinder and its hollow plunger, and means arranged coaxially with and being effective in the same direction as said hollow mold-clamping plunger and said nozzle-seating means for powerfully moving said injection plunger through an injection stroke.

8. An injection molding press comprising a multiple-part mold having an inlet leading to the mold matrix, means for supporting the mold, means for clamping the mold parts tightly together comprising a power cylinder and a hollow plunger extending therefrom and being reciprocable thereby, an injection cylinder arranged within said hollow plunger and being coaxial therewith, said injection cylinder carrying an injection nozzle, means carried by said hollow plunger for forcefully seating said nozzle upon the inlet of said mold when the hollow plunger is in mold-clamping position, means for regulating the axial position of said injection cylinder and nozzle relatively to said hollow plunger when said nozzle is out of contact with said mold, means for introducing a charge of molding material into said injection cylinder, an injection plunger in said injection cylinder arranged coaxially with said power cylinder and its hollow plunger, and means arranged coaxially with and being effective in the same direction as said hollow mold-clamping plunger and said nozzle-seating means for powerfully moving said injection plunger through an injection stroke.

9. An injection molding press comprising a mold having an inlet leading to the mold matrix, means for supporting the mold, a fluid operated plunger for clamping the mold positioned on said supporting means, an injection cylinder equipped with a nozzle, a spring for forcefully seating said nozzle upon said inlet when the plunger is in mold-clamping position, means for introducing a charge of material to be molded to said injection cylinder, an injection plunger, means for powerfully moving said injection plunger through an injection stroke, a clamping member movably mounted on said clamping plunger to transmit clamping stress exerted by the plunger, and means for yieldably supporting the clamping member on the plunger for movement toward and away from a position in which the clamping member abuts upon the plunger.

10. An injection molding press comprising a mold having an inlet leading to the mold matrix, means for supporting the mold, a fluid operated plunger for clamping the mold positioned on said supporting means, an injection cylinder equipped with a nozzle, a spring for forcefully seating said nozzle upon said inlet when the plunger is in mold-clamping position, means for introducing a charge of material to be molded to said injection cylinder, an injection plunger, means for powerfully moving said injection plunger through an injection stroke, a clamping member movably mounted on said clamping plunger to transmit clamping stress exerted by the plunger, said clamping member being mounted for movement axially of said plunger, and yieldable means interposed between the clamping member and the plunger to resist the relative movement between the clamping member and the plunger as the plunger moves out of clamping position.

11. The structure of the next-preceding claim, said injection cylinder being axially movable relatively to said clamping plunger, and means including an adjusting screw for accurately regulating the range of movement of said injection cylinder relatively to the clamping plunger.

HAROLD H. SWOGER.

REFERENCES CITED

The following references are of record in the file of this patent:

UNITED STATES PATENTS

| Number | Name | Date |
|---|---|---|
| 1,961,941 | Pack | June 5, 1934 |
| 2,102,328 | Morin et al. | Dec. 14, 1937 |
| 2,273,516 | Dinzl | Feb. 17, 1942 |
| 2,273,713 | Lawyer | Feb. 17, 1942 |
| 2,308,636 | Wheeler | Jan. 19, 1943 |
| 2,309,496 | Bird et al. | Jan. 26, 1943 |
| 2,322,200 | Tucker | June 15, 1943 |
| 2,351,774 | McGowen | June 20, 1944 |